(12) United States Patent
Watanabe

(10) Patent No.: US 6,633,528 B2
(45) Date of Patent: Oct. 14, 2003

(54) OPTICAL DISK APPARATUS

(75) Inventor: Kenichi Watanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 16 days.

(21) Appl. No.: 09/734,677

(22) Filed: Dec. 13, 2000

(65) Prior Publication Data

US 2001/0008509 A1 Jul. 19, 2001

(30) Foreign Application Priority Data

Dec. 20, 1999 (JP) .......................... 11-009610

(51) Int. Cl.[7] .................. G11B 33/12; G11B 33/14; G11B 33/02
(52) U.S. Cl. .................................. 369/75.1
(58) Field of Search ............... 369/75.1, 77.1, 369/77.2; 360/137, 97.02, 95; G11B 33/14

(56) References Cited

U.S. PATENT DOCUMENTS 5,067,041 A * 11/1991 Cooke et al. ............... 361/685
5,416,668 A * 5/1995 Benzoni ..................... 361/816
5,500,789 A * 3/1996 Miller et al. ................ 361/800
5,544,142 A * 8/1996 Funakiri ..................... 369/75.1
5,953,188 A * 9/1999 Higuchi et al. ............. 360/137

FOREIGN PATENT DOCUMENTS

| JP | 5-109259 | 3/1993 | |
|---|---|---|---|
| JP | 08138368 | * 5/1996 | .......... G11B/33/14 |
| JP | 9-326191 | 12/1997 | |
| JP | 11-003583 | 1/1999 | |
| JP | 11-203742 | 7/1999 | |

* cited by examiner

Primary Examiner—William Korzuch
Assistant Examiner—Christopher R Beacham
(74) Attorney, Agent, or Firm—Morgan, Lewis & Bockius LLP

(57) ABSTRACT

The optical disk apparatus is provided with a radiation shielding potion 3 including a horizontal section 31 in parallel to a bottom plate 73, and vertical sections 35, 35 which extend downwardly from both ends of the horizontal section, and provided in the vicinity of a front panel 4 to cross over a disk read section 2 equipped with a pickup 11. Further, each of the horizontal section 31 and the vertical sections 35, 35 is first shielding planes 33, 33, 37—37 in parallel to the front panel 4 and second shielding planes 32, 36, 36 perpendicular to the front panel. The vertical sections 35, 35 are secured to the bottom plate 73 at their lower ends.

4 Claims, 2 Drawing Sheets

OPTICAL DISK APPARATUS

BACKGROUND OF THE INVENTION

This invention relates to an optical disk apparatus equipped with a pick-up which is driven by a signal on which a high frequency signal is superposed, and more particularly to an optical disk apparatus in which unnecessary radiation leaking externally is attenuated by a radiation shielding section formed to cross over a disk read section equipped with the pick-up.

In a DVD reproduction apparatus, a pick-up is driven by a signal on which a high frequency signal at e.g. 350 MHz is superposed. This generates unnecessary radiation from the pick up. However, such unnecessary radiation is shielded by a front panel of an enclosure, where it is made of metal, so that the level of the unnecessary radiation leaking externally is attenuated.

On the other hand, where the front panel is made of resin in order to reduce cost of the apparatus, since no shield is located in front of the front face of the enclosure, the level of the unnecessary radiation leaking externally from the front side is enhanced. In order to prevent this, a configuration was proposed in which the entire rear surface of the front panel is covered with a metallic plate. However, the structure for attaching the metallic plate was made complicate since a switch and other components are provided on the front panel. Therefore, conventionally, a configuration was adopted in which the entire upper surface and side surfaces of a disk read section equipped with the pickup are covered with a metallic plate (first prior art).

Another configuration in which a magneto-optic disk apparatus is equipped with a contact is disclosed in the Unexamined Japanese Patent Application Publication No. Hei 11-203742. Specifically, in this technique, an electrode wire of carbon fiber with good conductivity is supported by a clamper on a supporting arm of a magnetic head. The rear end of the electrode wire is connected to a grounding level. Therefore, during a read operation, the electrode wire is brought into contact with the label face of the optical disk earlier than the magnetic head. Thus, static electricity is discharged from a charged optical disk so that the control circuit and audio circuit are protected from discharging electric shock. Deposition of dust on the optical disk is also prevented (second prior art).

However, where the first prior art is adopted, the following problem was presented. Specifically, where the upper surface and side surfaces of the disk read section equipped with the pickup are covered with a metallic plate, the pickup cannot be directly seen unless the metallic plate is removed. Therefore, when the state of the pickup must be checked, such as the case where maintenance is executed for the apparatus, the metallic plate must be removed. This increased the time and labor of maintenance.

Further, the second prior art, which intends to discharge the static electricity from the charged optical disk, was a technique difficult to use from the standpoint of preventing the unnecessary radiation.

SUMMARY OF THE INVENTION

This invention has been accomplished in order to solve the above problems. An object of the invention is to provide an optical disk apparatus which can attenuate unnecessary radiation at a high frequency without increasing the time and labor during maintenance even when an enclosure with a front panel of resin and the other sections of metal is used in such a manner that a radiation shielding section is provided in the vicinity of the front panel so as to cross over a disk read section equipped with a pickup.

Another object of the invention is to provide an optical disk apparatus which can increase the rate of attenuating the unnecessary radiation by providing a radiation shielding section with two shielding planes in parallel to the front panel.

Another object of the invention is to provide an optical disk apparatus which can increase the attenuation coefficient of the unnecessary radiation by arranging a contact member on the upper surface of radiation shielding section so to connect the radiation shielding section to a top table.

Still another object of the invention is to provide an optical disk apparatus which can increase the withstand voltage for static electricity by providing two contacts.

A further object of the invention is to provide an optical disk apparatus which can increase the strength of a front panel by securing the contact members to a horizontal section by screws through upper supporting members formed at the front panel.

In order to solve the above problems, this invention provides an optical disk apparatus provided with a pickup which is driven by a signal on which a high frequency signal is superposed, comprising: a radiation shielding section including a horizontal section in parallel to a bottom plate of an enclosure, and vertical sections which extend downwardly from both ends or the horizontal section, and provided in the vicinity of a front panel to cross over a disk read section equipped with the pickup, wherein each of the horizontal section and the vertical sections has first shielding planes in parallel to the front panel and a second shielding plane perpendicular to the front panel, and the vertical sections are secured to the bottom plate at their lower ends.

In such a configuration, a part of the unnecessary radiation generated toward the front panel from the pickup is attenuated by the first shielding planes and another part thereof is attenuated by the second shielding plane. The radiation shielding section does not cover the upper section of the disk read section.

In addition to the above configuration, the second shielding plane is rectangular, and the first shielding planes are provided on both ends in the width direction of the second shielding plane.

In this configuration, a part of the unnecessary radiation generated toward the front panel from the pickup is attenuated by the first shielding planes close to the disk read section and another part thereof is attenuated by the first shielding planes close to the front panel when they are brought into contact with the top plate.

In addition to the above configuration, the horizontal section is equipped with contact members for electrically connecting the top plate to the radiation shielding section.

Namely, the horizontal section of the radiation shielding section is electrically connected to the top plate through the contact members. Therefore, the horizontal section is connected to the level of ground with a very low impedance. In this case, the rate of the unnecessary radiation attenuated by the horizontal section becomes high.

In addition to the above configuration, the contact members are provided in the vicinities of both ends of the horizontal section in a direction in parallel to the front panel.

Specifically, the top plate is electrically connected to the horizontal section, in a direction in parallel to the front panel, through the contact members provided in the vicinities of both ends of the horizontal section. The horizontal section is electrically connected to the bottom plate through the vertical sections provided at its both ends.

Therefore, the forward section of the top plate is electrically connected to the bottom plate with a value approximately equal to the impedance resulting from passing only the contact members and vertical sections. Thus, the impedance of the passage connecting the top plate and the bottom plate is very low. As a result, for example, when static electricity is applied to the top plate of the enclosure, it flows to the level of ground (chassis level) with a very low impedance.

In addition to the above configuration, the contact members are secured to the horizontal section by screws through upper supporting members provided at the front panel.

Namely, the upper side of the front panel is secured by the radiation shielding section.

DETAILED DESCRIPTION OF THE PREFERRED EMBODIMENTS

Figure 1:
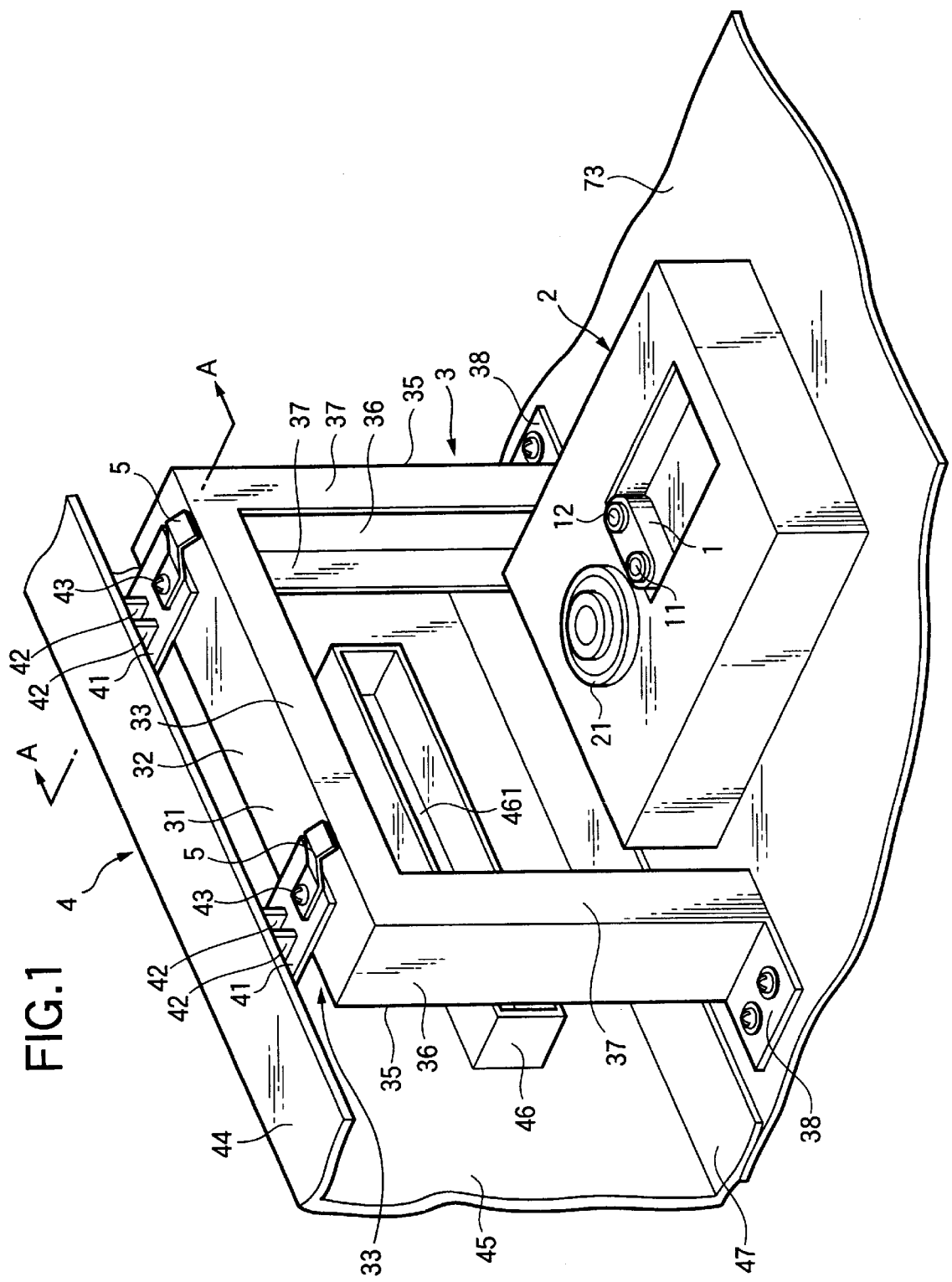
FIG. 1 is a perspective view showing the state of the vicinity of a radiation shielding section in an embodiment of the optical disk apparatus according to this invention.

Now referring to the drawings, an explanation will be give of various embodiment of the invention.

Figure 3:
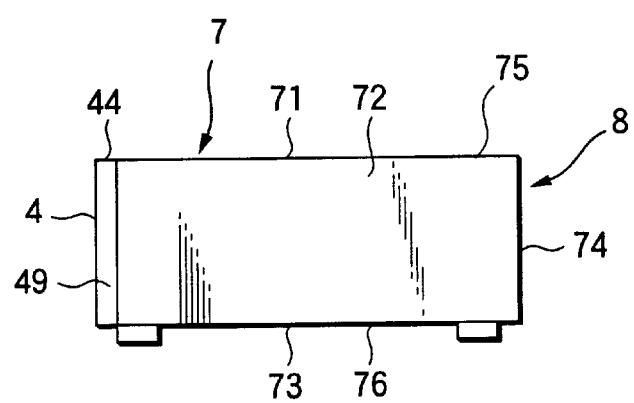
FIG. 3 is a side view showing the appearance of the optical disk apparatus according to the embodiment of this invention.

FIG. 3 is a side view showing the appearance of an embodiment of an optical disk apparatus (DVD player) according to the invention.

As seen from FIG. 3, the enclosure 7 of a DVD player 8 includes three members consisting of a cover 75 integrally composed of a top plate 71 and side plates 72, a chassis 76 integrally composed of a bottom plate 73 and a back plate 74 and a front panel 4. The cover 75 and chassis 76 are made of metallic plates. The front panel 4 is made of resin. Namely, the enclosure 7 is so designed that it does not have the shielding capability on the front side for the unnecessary radiation at a high frequency generated internally.

Figure 2:
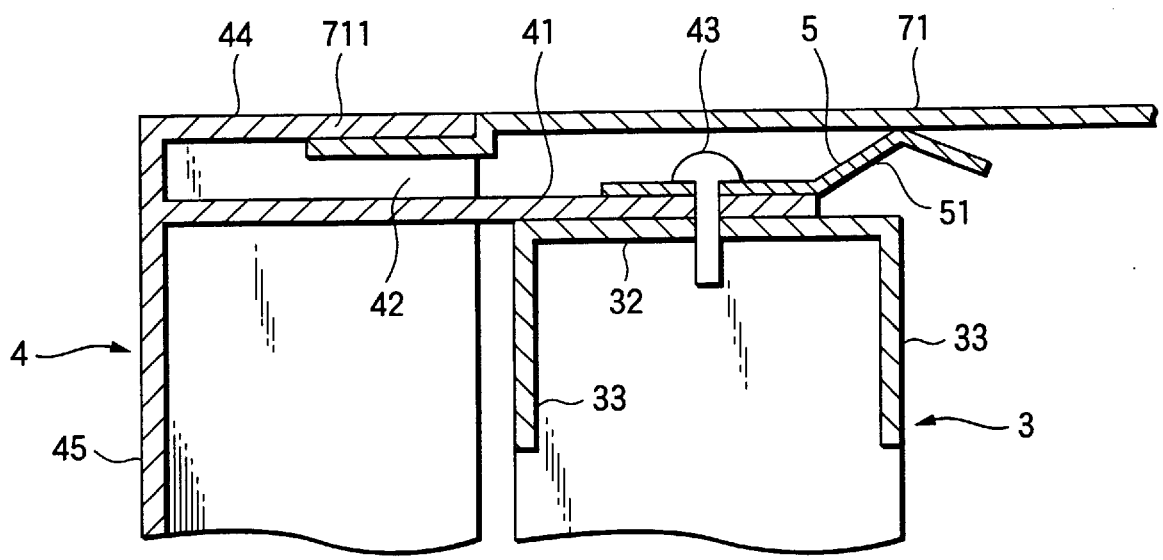
FIG. 2 is a section taken in line A—A in FIG. 1.

FIG. 1 is a perspective view showing the state in the vicinity of the radiation shielding section. FIG. 2 is a sectional view taken in line A—A in FIG. 1 which shows the state where the top plate 71 is attached.

In FIG. 1, a disk read section 2 in the form of a rectangular solid provided with a pickup supporting unit 1 is centrally arranged when viewed from the side of the front panel 4. The disk read section 2 incorporates a driving mechanism for driving the pickup supporting unit 1 in a direction perpendicular to the front panel 4. The disk read section 2 is provided with a turn table 21 for rotating a DVD or CD.

The pickup supporting unit 1 is equipped with a pickup 11 for reading the data from the DVD and another pickup 12 for reading the data from the CD. The pickup 12 for reading the data from the DVD is driven by the signal on which a high frequency signal at e.g. 350 MHz is superposed. Therefore, the unnecessary radiation at the high frequency is generated from the pickup 11.

A radiation shielding section 3 is provided to attenuate the level when the unnecessary radiation generated from the pickup 11 passes though the front panel 4 so that it is externally leaked. The radiation shielding potion 3 is a member formed by bending a metallic plate such as an iron plate. Specifically, the radiation shielding section 3 includes a horizontal section 31 in parallel to the bottom plate 73 and vertical sections 35, 35 which extend downwardly from both ends of the horizontal section 31, respectively. The radiation shielding section 3 is provided to cross over the disk read section 2 in the vicinity of the front panel 4.

Specifically, the horizontal section 31 is composed of a second shielding plane 32 which is perpendicular to the front panel 4 and rectangular and first shielding planes 33, 33 which are in parallel to the front panel 4. The first shielding plane 33 is extended along the substantially entire longitudinal length of the second shielding plane 32 on its both sides in the width direction.

The vertical sections 35, 35 are composed of second shielding planes 36, 36 which are perpendicular to the front panel 4 and rectangular and first shielding planes 37—37 which are in parallel to the front panel 4. The first shielding planes 37—37 are extended along the substantially entire longitudinal length of the second shielding planes 36, 36 on both sides in their width direction.

The second shielding planes 36, 36 have tongues extended at their lower side ends in a longitudinal direction over the ends of the first shielding planes 37—37. The tongues constitute legs 38 which are bent at right angles outwardly. The radiation shielding section 3 is secured to the bottom plate 73 by screws.

The front panel 4 includes a panel body 45, an upper frame 44, a lower frame 47 and side frames 49 (FIG. 3). On the upper side of the panel body 45 and at the positions corresponding to the vicinities of both ends of the horizontal section 31, upper supporting members 41, 41 are formed. Specifically, the upper supporting members 41, 41 are formed in flat rectangular shape. The upper supporting members 41, 41 are formed convexly from the panel body 45 so that they are in parallel to the upper frame 44.

A pair of reinforcement members 42—42 are formed between the upper frame 44 and each of the upper supporting members 41, 41.

Each of contact members 5, 5 for electrically connecting the horizontal section 31 of the radiation shielding section 3 and the top plate 71 is made of a metallic plate having a segment bent in a substantial V-shape. The contact members 5, 5 are secured to the second shielding plate 32 of the horizontal section 31 by screws 43, 43.

The top plate 71 has a step section 711 at its forward section. The step section 711 is engaged into the inside of the upper frame 44 of the front panel 4. When the upper surface of the step section 711 of the top plate 71 is brought into contact with the lower surface of the upper frame section 44, the contact members 5, 5 are brought into contact with the lower surface of the top plate 71.

Additionally, the panel body 45 has an opening section 461 into which the DVD or CD is externally pulled and an opening frame 46 formed along the edge thereof. Another opening section (not shown) for a display is formed on the upper side of the opening section 461 of the panel body 45. The mechanism for externally pulling the DVD or CD into the opening is not shown.

An explanation will be given of the operation of the embodiment having the arrangement described above.

In the reproduction of the DVD, the pickup 11 is driven by the signal on which a high frequency signal is superposed. Therefore, the unnecessary radiation is generated from the pickup 11. The unnecessary radiation spreads all around the upper side of the disk read section 2. The unnecessary radiation generated toward the top plate 71 and side plates 72 of the cover 75 or the rear panel 74 is shielded by the top plate 71, side plates 72 and rear panel 74 all of which are made of metallic plates.

On the other hand, the unnecessary radiation generated toward the front panel 4 from the pickup 11 is attenuated by the radiation shielding section 3. Specifically, the unnecessary radiation generated toward the periphery of the opening section 461 is attenuated by the first shielding plane 33 of the horizontal section 31, on the side close to the front panel 4, and the first shielding planes 37, 37 of the vertical sections 35, 35 on the side close to the front panel 4.

The unnecessary radiation generated toward the upper frame 44 of the front panel 4 is first attenuated by the second shielding plane 33 on the side close to the disk read section 2 and further attenuated by the second shielding plane 32. Namely, the unnecessary radiation is attenuated twice. Further, the unnecessary radiation generated toward the side frame 49 of the front panel 4 is first attenuated by the first shielding planes 37, 37 on the side close to the disk read section 2, and further attenuated by the second shielding planes 36, 36. Namely, the unnecessary radiation is attenuated twice.

As understood from the above description, the unnecessary radiation generated toward the front panel 4 from the pickup 11 is attenuated all around the front panel 4 by the radiation shielding section 3. Therefore, the level of the unnecessary radiation which leaks forward is attenuated. The rate of attenuation is about 6 dB in this embodiment. Thus, the level of the unnecessary radiation can be reduced to a level with no trouble in practical use.

The horizontal section 31 of the radiation shielding section 3 is electrically connected to the top plate 71 through the contact members 5, 5. Therefore, the horizontal section 31 is connected to the level of ground with a very low impedance. In this case, the rate of the unnecessary radiation attenuated by the horizontal section 31 is higher than that in the case where the contact members 5, 5 are not provided.

The forward section of the top plate 71 is electrically connected to the horizontal section 31 through the contact members 5, 5 provided in the vicinities of both ends of the horizontal section 31. The horizontal section 31 is electrically connected to the bottom plate 73 through the vertical sections 35, 35 provided at its both ends.

Therefore, the forward section of the top plate 71 is electrically connected to the bottom plate 73 with a value approximately equal to the impedance resulting from passing only the contact members 5, 5 and vertical sections 35, 35. Thus, the impedance of the passage connecting the top plate 71 and the bottom plate 73 is very low. As a result, for example, when static electricity is applied to the top plate 71 of the enclosure 7, it flows to the level of ground (electric level of the bottom plate 73) with a very low impedance. This reduces the influence of electricity on an electric circuit (not shown).

The upper side of the front panel 4, which is supported by the radiation shielding section 3, increases the strength of the front panel 4.

As understood from the description hitherto made, the optical disk apparatus according to this invention is provided with a radiation shielding section including a horizontal section in parallel to a bottom plate of an enclosure, and vertical sections which extend downwardly from both ends of the horizontal section, and provided in the vicinity of a front panel to cross over a disk read section equipped with a pickup. Further, each of the horizontal section and the vertical sections has first shielding planes in parallel to the front panel and a second shielding plane perpendicular to the front panel, and the vertical sections are secured to the bottom plate at their lower ends. In such a configuration, the unnecessary radiation generated toward the front panel from the pickup is attenuated by the first shielding planes and also attenuated by the second shielding plane. In addition, the radiation shielding section does not cover the upper section of the disk read section. Therefore, also when the enclosure in which the front panel is made of resin, and the remaining section is metal is used, unnecessary radiation at a high frequency can be attenuated without increasing the time and labor during maintenance.

In addition to the above configuration, the second shielding plane is rectangular, and the first shielding planes are provided on both ends in the width direction of the second shielding plane. In this configuration, a part of the unnecessary radiation generated toward the front panel from the pickup is attenuated by the first shielding planes close to the disk read section and another part thereof is attenuated by the first shielding planes close to the front panel. This permits the rate of attenuating the unnecessary radiation to be enhanced.

Further, the horizontal section is equipped with contact members for electrically connecting the top plate to the radiation shielding section when they are brought into contact with the top of the enclosure. Therefore, the horizontal section is connected to the level of ground with a very low impedance. In this case, the horizontal potion increases the rate of attenuating the unnecessary radiation, the rate of the unnecessary radiation attenuated by the horizontal section can be enhanced.

In a direction in parallel to the front panel, the contact members are provided in the vicinities of both ends of the horizontal section. Therefore, the top plate is electrically connected to the bottom plate with a very low impedance. As a result, when static electricity is applied to the top plate and others, it flows to the level of ground with a very low impedance.

This enhances the withstand voltage to the static electricity.

The contact members are secured to the horizontal section by screws through upper supporting members provided at the front panel. Namely, the upper side of the front panel is secured by the radiation shielding section. This increases the strength of the front panel.

What is claimed is:

1. An optical disk apparatus comprising:
   a front panel member;
   a disk read section provided with at least a pickup, the pickup being driven by a signal on which a high frequency signal is superposed and which generates unnecessary radiation at least toward said front panel;
   an enclosure section which includes a cover member integrally composed of a top plate and side plates;
   a radiation shielding section including a horizontal section in parallel to a bottom plate of an enclosure, and vertical sections which extend downwardly from both ends of the horizontal section, the radiation shielding section being disposed in the vicinity of the front panel to cross over a substantially limited portion of one end of the disk read section,
   wherein each of said horizontal section and said vertical sections further comprises:

a plurality of first shielding planes in parallel to the front panel for attenuating a part of the unnecessary radiation generated toward the front panel; and a second shielding plane perpendicular to the front panel for attenuating another part of the unnecessary radiation generated toward the front panel, wherein said vertical sections are secured to the bottom plate at the lower ends thereof, and wherein said horizontal section is equipped with a plurality of contact members for electrically connecting said top plate to said radiation shielding section, when said radiation shielding section is brought into contact with said top plate, whereby said unnecessary radiation generated toward the front panel is twice attenuated and whereby said pickup is directly visible.

2. The optical disk apparatus according to claim 1, wherein said contact members are provided in the vicinities of both ends of said horizontal section in a direction in parallel to said front panel.

3. The optical disk apparatus according to claim 1, wherein said contact members are secured to said horizontal section by screws through upper supporting members provided at said front panel.

4. The optical disk apparatus according to claim 1, wherein said second shielding plane is rectangular, and said first shielding planes are provided on both ends in the width direction of said second shielding plane.

* * * * *